US 12,401,681 B2

(12) United States Patent
Choi et al.

(10) Patent No.: US 12,401,681 B2
(45) Date of Patent: Aug. 26, 2025

(54) METHOD AND APPARATUS FOR FINDING HIDDEN IP ADDRESS IN MALICIOUS SITE USING DNS SERVICE

(71) Applicant: AI SPERA INC., Seoul (KR)

(72) Inventors: Dong Sik Choi, Seoul (KR); Byung Tak Kang, Seoul (KR)

(73) Assignee: AI SPERA INC., Seoul (KR)

( * ) Notice: Subject to any disclaimer, the term of this patent is extended or adjusted under 35 U.S.C. 154(b) by 254 days.

(21) Appl. No.: 18/056,517

(22) Filed: Nov. 17, 2022

(65) Prior Publication Data

US 2023/0275922 A1   Aug. 31, 2023

(30) Foreign Application Priority Data

Feb. 25, 2022   (KR) .......................... 10-2022-0024758

(51) Int. Cl.
*H04L 9/40* (2022.01)
*H04L 61/4511* (2022.01)
*H04L 61/5007* (2022.01)

(52) U.S. Cl.
CPC ...... *H04L 63/1441* (2013.01); *H04L 61/4511* (2022.05); *H04L 61/5007* (2022.05)

(58) Field of Classification Search
CPC ............. H04L 63/1441; H04L 61/5007; H04L 61/4511
See application file for complete search history.

(56) References Cited

U.S. PATENT DOCUMENTS 10,462,159 B2 * 10/2019 Inoue ................... C10M 135/36
10,574,681 B2 *  2/2020 Meshi ..................... G06N 20/00
(Continued)

FOREIGN PATENT DOCUMENTS

CN       115757991 A   *  3/2023
CN       116192439 A   *  5/2023
(Continued)

OTHER PUBLICATIONS

"T. Urvoy et al., Tracking Web Spam with HTML Style Similarities, Mar. 3, 2008, Orange Labs, vol. 2, pp. 1-28" (Year: 2008).*
(Continued)

*Primary Examiner* — Philip J Chea
*Assistant Examiner* — Ghizlane Maazouz
(74) *Attorney, Agent, or Firm* — Studebaker Brackett PLLC

(57) ABSTRACT

The present disclosure provides a method for finding a hidden IP address in a malicious site using a domain name system (DNS) service, which is executed by a computer. The method includes the operations of: collecting real IP addresses for servers based on a predefined service port; extracting a first IP address candidate group by performing banner filtering from the real IP addresses based on response information of a malicious site using a DNS service; extracting a second IP address candidate group by performing HTML filtering to verify whether the first IP address candidate group is similar to a HTML source of the malicious site; extracting a final IP address by performing image filtering to verify whether the second IP address candidate group is similar to an image of the malicious site; and determining whether the final IP address is a real IP address of the malicious site.

13 Claims, 7 Drawing Sheets

(56) References Cited

U.S. PATENT DOCUMENTS

| | | | |
|---|---|---|---|
| 10,701,085 B2* | 6/2020 | Chiba | G06N 20/00 |
| 11,483,343 B2* | 10/2022 | Kohavi | H04L 63/1425 |
| 2015/0074807 A1* | 3/2015 | Turbin | H04L 63/145 |
| | | | 726/23 |
| 2015/0237068 A1* | 8/2015 | Sandke | H04L 63/1425 |
| | | | 726/23 |
| 2017/0041333 A1* | 2/2017 | Mahjoub | H04L 43/0876 |
| 2018/0324193 A1* | 11/2018 | Ronen | G06N 20/00 |
| 2019/0036871 A1* | 1/2019 | Lapidous | H04L 61/10 |
| 2020/0366700 A1* | 11/2020 | Prokop | H04L 63/1425 |
| 2021/0067532 A1* | 3/2021 | Bruno | G06F 21/554 |
| 2021/0084054 A1* | 3/2021 | Young | H04L 63/1416 |
| 2021/0266331 A1* | 8/2021 | Meshi | H04L 63/1425 |
| 2021/0400080 A1* | 12/2021 | Kaidi | G06N 5/025 |
| 2022/0083658 A1* | 3/2022 | Shah | G06F 21/54 |
| 2022/0377052 A1* | 11/2022 | Thumma | H04L 63/0209 |
| 2023/0229788 A1* | 7/2023 | Pieno | G06F 16/24552 |
| | | | 726/25 |
| 2024/0114052 A1* | 4/2024 | Karta | H04L 63/0245 |
| 2024/0305611 A1* | 9/2024 | Chiang | G06F 16/95 |

FOREIGN PATENT DOCUMENTS

| | | | |
|---|---|---|---|
| CN | 116798045 A | * | 9/2023 |
| KR | 10-2010-0123368 A | | 11/2010 |
| KR | 10-2014-0077659 A | | 6/2014 |
| KR | 20160027842 A | * | 3/2016 |
| KR | 10-2019-0026691 A | | 3/2019 |
| KR | 10-2019-0098492 A | | 8/2019 |
| KR | 10-2169073 B1 | | 10/2020 |

OTHER PUBLICATIONS

Kang, H. et al.; "Study on Collecting Server Information through Banner Grabbing"; Journal of The Korea Institute of Information Security & Cryptology; Dec. 31, 2017; pp. 1317-1330; vol. 27, No. 6; URL: https://koreascience.or.kr/article/JAKO201706749670628. page.

Office Action issued in KR 10-2022-0024758; mailed by the Korean Intellectual Property Office on Oct. 24, 2023.

* cited by examiner

FIG. 5

Inbound: Safe Outbound: Safe
cloud hosting
54.180.48.243:80 >
ec2-54-180-48-243.ap-northeast-2.compute.amazonaws.com
2022-02-16 22:25:00
Republic of Korea
Amazon.com,Inc.
awselb HTTP header:HTTP/1.1 200 OK
Server:awselb/2.0
Date:Wed,16Feb 2022 10:06:32 GMT
Content-Type:text/html;charset=utf-8
Content-Length:326067
Connection:close
vary:Accept-Encoding
etag:"4f9b3-TqniJeGchj/0o7A/YYMkSqi3G6o"

FIG. 6A

Inbound: (Safe) Outbound: (Safe)
(cloud) (hosting)
15.164.253.222:80 >
2021-09-27 13:24:21
Republic of Korea
Amazon.com,Inc.
awselb
(HTTP(80)) (HTTP(443))

HTTP/1.1
Status:403 Forbidden
Date:Mon, 27 Sep 2021 04:23:05 GMT
Content Length:13
Content Type:text/plain;charset=utf-8
Server:awselb/2.0

403 Forbidden

TLS Certificate
Version:3
Serial Number:147939787799387337677551365380345 65035
Signature Algorithm:
  Name:SHA256WithRSA
  Oid:1.2.840.113549.1.1.11
Issuer"....

FIG. 6B

Inbound: (Safe) Outbound: (Safe)
(cloud) (hosting)
15.165.142.166:80 >
2021-09-27 13:24:18
Republic of Korea
Amazon.com,Inc.
awselb
(HTTP(80)) (HTTP(443)) (HTTP(8080)) (8081)

HTTP/1.1
Status:403 Forbidden
Date:Mon, 27 Sep 2021 04:22:49 GMT
Content Type:text/html
Server:nginx/1.20.1

<html>
<head><title>404 Not Found</title></head>
<body>
<center><h1>404 Not Found</h1></center>
<hr><center>nginx/1.20.1</center>
</body>
</html>
<!--a padding to disable MSIE and Chrome friendly error page -->
<!--a padding to disable MSIE and Chrome friendly error page -->
<!--a padding to disable MSIE and Chrome friendly error page --> ...

FIG. 8
MSE:16256.49,SSIM:0.66
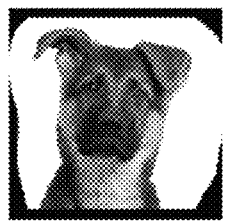 
MSE:19752.04, SSIM:0.61
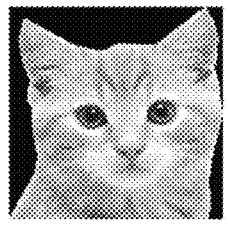 
MSE:6486.11, SSIM:0.82
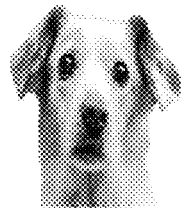 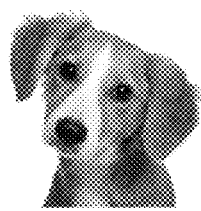
MSE:9602.15, SSIM:0.67
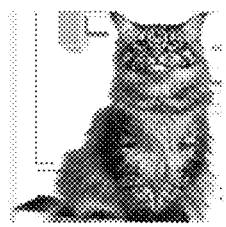 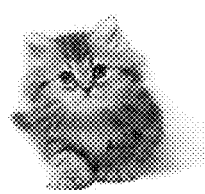

METHOD AND APPARATUS FOR FINDING HIDDEN IP ADDRESS IN MALICIOUS SITE USING DNS SERVICE

CROSS-REFERENCE TO RELATED APPLICATION

A claim for priority under 35 U.S.C. § 119 is made to Korean Patent Application No. 10-2022-0024758 filed on Feb. 25, 2022 in the Korean Intellectual Property Office, the entire contents of which are hereby incorporated by reference.

BACKGROUND

1. Technical Field

The present disclosure relates to a method and an apparatus for finding a hidden IP address in a malicious site using a domain name system (DNS) service.

2. Description of Related Art

Many malicious sites use a domain name system (DNS) service to hide the IP addresses of real servers running the malicious sites. In other words, there are cases in which a real IP address of a malicious site is hidden through such a DNS service.

For example, in the case of a specific DNS service for providing security, even if a DNS lookup is performed for a domain such as aaaa.net, the IP address of the real server mapped to the domain name (e.g., aaaa.net) is not provided but the IP address of the DNS server providing the DNS service is provided. When such a DNS service is used, the DNS service serves to hide the IP address of the server actually operating. As such, the DNS service can block DDoS attacks and prevent direct attacks on the real server by hiding the real IP address. However, in a case in which hackers operate illegal services, there is a problem in that investigation authorities cannot find the IP addresses of the servers operated by the hackers.

Therefore, even if the real IP address of a malicious site is concealed by using the DNS service with a malicious intention, a method to find the same is required.

SUMMARY

An object of the present disclosure is to provide a method and an apparatus for finding a hidden IP address in a malicious site using a domain name system (DNS) service.

The aspects of the present disclosure are not limited to those mentioned above, and other aspects not mentioned herein will be clearly understood by those skilled in the art from the following description.

To accomplish the above-mentioned objects, according to an aspect of the present disclosure, there is provided a method for finding a hidden IP address in a malicious site using a domain name system (DNS) service, which is executed by a computer, the method including the operations of: collecting real IP addresses for servers based on a predefined service port; extracting a first IP address candidate group by performing banner filtering from the real IP addresses based on response information of a malicious site using a DNS service; extracting a second IP address candidate group by performing HTML filtering to verify whether the first IP address candidate group is similar to a HTML source of the malicious site; extracting a final IP address by performing image filtering to verify whether the second IP address candidate group is similar to an image of the malicious site; and determining whether the final IP address is a real IP address of the malicious site.

Moreover, the operation of collecting real IP addresses for the servers collects the real IP addresses for the servers by performing port scanning based on the predefined service port, and the predefined service port includes an HTTP 80 port or an HTTPS 443 port.

Furthermore, the operation of extracting the first IP address candidate group includes the operations of: receiving the response information in response to an HTTP or HTTPS request from the malicious site; obtaining banner information by performing banner grabbing with respect to the real IP addresses; performing the banner filtering with respect to the banner information obtained from the real IP addresses based on the response information of the malicious site; and extracting the first IP address candidate group from the real IP addresses based on the banner filtering.

Additionally, the operation of performing the banner filtering includes: verifying whether a specific HTTP status code is included in the banner information; verifying whether an HTML source is included in the banner information; and verifying whether title information of the malicious site is included in the banner information.

In addition, the operation of extracting the second IP address candidate group includes the operations of: obtaining an HTML source for the first IP address candidate group extracted based on the banner filtering; performing the HTML filtering based on the HTML source for the first IP address candidate group; and extracting the second IP address candidate group from the first IP address candidate group based on the HTML filtering.

Moreover, the operation of performing the HTML filtering includes: extracting all URLs included in the HTML source for the first IP address candidate group; counting the number of URLs including the domain address of the malicious site among all the URLs; and verifying whether a similarity value derived based on the number of all URLs and the counted number is greater than a predetermined threshold value.

Furthermore, the operation of performing the HTML filtering includes: calculating HTML similarity based on style similarity and structural similarity between the HTML source for the first IP address candidate group and the HTML source of the malicious site; and verifying whether the HTML similarity is greater than a predetermined threshold.

Additionally, the image filtering includes: calculating a structural similarity index measure (SSIM) with respect to image information of the second IP address candidate group extracted based on the HTML filtering and image information of the malicious site; and verifying whether the structural similarity index measure is greater than a predetermined threshold.

In another aspect of the present invention, there is provided an apparatus executing a method for finding a hidden IP address in a malicious site using a domain name system (DNS) service, the apparatus including: a collecting unit collecting real IP addresses for servers based on a predefined service port; a first filtering unit extracting a first IP address candidate group by performing banner filtering from the real IP addresses based on response information of a malicious site using a DNS service; a second filtering unit extracting a second IP address candidate group by performing HTML filtering to verify whether the first IP address candidate group is similar to a HTML source of the malicious site; a third filtering unit extracting a final IP address by performing image filtering to verify whether the second IP address candidate group is similar to an image of the malicious site; and a determining unit determining whether the final IP address is a real IP address of the malicious site.

Besides the above, a computer program stored in a computer readable recording medium for embodying the present disclosure may be additionally provided.

Besides the above, a computer readable recording medium to record computer programs for executing the method may be additionally provided.

BRIEF DESCRIPTION OF THE DRAWINGS

FIGS. 5 to 6B are diagrams for explaining banner filtering according to an embodiment of the present disclosure.

FIG. 8 is a diagram for explaining image filtering according to an embodiment of the present disclosure.

DETAILED DESCRIPTION

Figure 1:
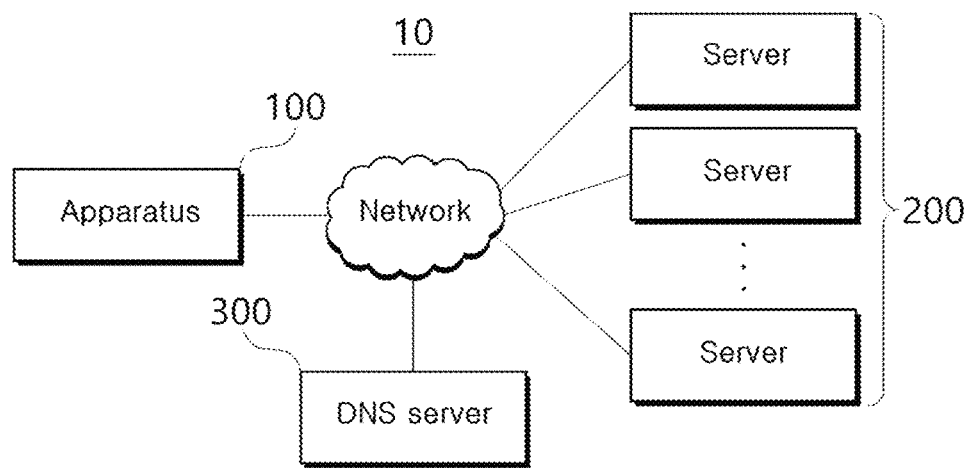
FIG. 1 is a schematic diagram illustrating a system in which a method for finding a hidden IP address in a malicious site using a domain name system (DNS) service according to an embodiment of the present disclosure is performed.

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skill in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

In the drawings, like reference numerals designate like components. This disclosure does not describe all components of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one component, or a unit, a module, a member, or a block may include a plurality of components.

Throughout this specification, when a part is referred to as being "connected" to another part, this includes "direct connection" and "indirect connection", and the indirect connection may include connection via a wireless communication network. Furthermore, when a certain part "includes" a certain component, other components are not excluded unless explicitly described otherwise, and other components may in fact be included.

In the entire specification of the present disclosure, when any member is located "on" another member, this includes a case in which still another member is present between both members as well as a case in which one member is in contact with another member.

Identification codes in each operation are used not for describing the order of the operations but for convenience of description, and the operations may be implemented differently from the order described unless there is a specific order explicitly described in the context.

Hereinafter, operation principles and embodiments of the present disclosure will be described with reference to the accompanying drawings.

FIG. 1 is a schematic diagram illustrating a system in which a method for finding a hidden IP address in a malicious site using a domain name system (DNS) service according to an embodiment of the present disclosure is performed. Hereinafter, for convenience of description, the system in which the method for finding a hidden IP address in a malicious site using a domain name system (DNS) service according to an embodiment of the present disclosure is performed will be briefly referred to as a system 10.

Referring to FIG. 1, the system 10 according to an embodiment of the present disclosure includes an apparatus 100, one or more servers 200, and a DNS server 300 for performing a method for finding a hidden IP address in a malicious site using a domain name system (DNS) service. Here, the system 10 illustrated in FIG. 1 is only an example, and may include fewer or more components than the components illustrated in FIG. 1.

The apparatus 100 may perform the method for finding a hidden IP address in a malicious site using the DNS service according to an embodiment of the present disclosure. That is, the apparatus 100 may operate to detect a real IP address of a server operating a malicious site using the DNS service.

A detailed description of a process of detecting a real IP address of a malicious site by the apparatus 100 will be described later.

The servers 200 are devices for providing various services to clients (e.g., user terminals such as a computer, a laptop computer, a smartphone, etc.) connected through a network, and may provide a web site to the clients.

In addition, the servers 200 may use the DNS service provided by the DNS server 300, and may access a web site using a predetermined domain instead of a real IP address of the server.

The DNS server 300 is a device providing the DNS service, and may store several domains and IP addresses corresponding to the domains. For example, the DNS server 300 may store IP addresses of the servers 200 and domain names corresponding to the IP addresses in a lookup table.

Here, the DNS service refers to a system that converts a domain name into an IP address in order to make it possible to access a specific site only with the domain name without having to memorize a numeric IP address of the site. For example, while an IP address is a 4-byte numeric address separated by periods in each byte, such as "111.112.113.114", a domain name consists of characters, such as "www.abc.co.kr". Names are easier to understand or remember than numbers.

For example, in a case in which a client (i.e., user terminal) inputs a site address of www.abc.co.kr to access a site having the site address of www.abc.co.kr, the client (i.e., user terminal) may transmit a DNS query packet to the DNS server 300 to request the IP address of www.abc.co.kr. In this instance, the DNS server 300 may extract 111.112.113.114, which is the IP address corresponding to www.abc.co.kr, and deliver the real site address and the corresponding IP address to the client (i.e., user terminal). Therefore, the client (i.e., the user terminal) can access the corresponding site by using the domain name instead of using the IP address of the real server.

Here, the servers 200 and the DNS server 300 include all kinds of handheld wireless communication devices capable of being connected to a web server through a network, such as a cellular phone, a smartphone, a personal digital assistant (PDA), a portable multimedia player (PMP), a tablet PC, and the like, and is one type of digital device having a memory means, such as a personal computer (e.g., a desktop computer, a notebook computer, etc.), a workstation, a personal digital assistant (PDA), a web pad, and the like, and has a micro-processor to have arithmetic capacity.

Next, the network can transmit and receive various information with the apparatus 100, the servers 200, and the DNS server 300. The network can use one among a variety of types of communication networks, for example, a wireless communication method such as a wireless local area network (WLAN), Wi-Fi, WiBro, WiMAX, high speed downlink packet access system (HSDPA), and the like, or a wired communication method such as Ethernet, xDSL (ADSL or VDSL), hybrid fiber coax (HFC), fiber to the curb (FTTC), fiber to the home (FTTH), and the like.

The network is not limited to the communication method presented above, and may include all types of communication methods that are well-known or to be developed in the future in addition to the above-described communication methods.

Meanwhile, in the case of using the DNS service as described above, it is convenient because the client uses the domain name instead of using the IP address of the corresponding server to access a specific website. However, in the case of using a specific DNS service for security reasons, the IP address of the DNS server is extracted instead of extracting the IP address of the real server corresponding to the domain name of the website. In this case, since the DNS service serves to hide the IP address of the real server, there is a security effect since it is possible to block DDoS attacks on the real server. However, if a server operated for a malicious purpose or a server providing illegal services uses the DNS service, the real IP address of the server cannot be found. Accordingly, there are several problems in that clients accessing the malicious sites (or harmful sites) provided by these servers may be damaged and the malicious sites (or harmful sites) cannot be blocked at the source.

Therefore, the present disclosure provides a method for finding a real IP address of a malicious site (or harmful site) using the DNS service with malicious intention.

Figure 2:
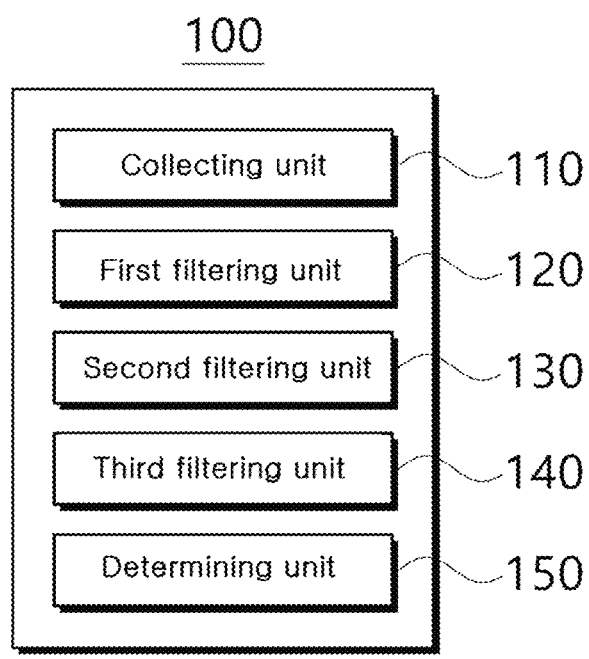
FIG. 2 is a block diagram schematically illustrating an apparatus for finding a hidden IP address in a malicious site using a domain name system (DNS) service according to an embodiment of the present disclosure.

FIG. 2 is a block diagram schematically illustrating an apparatus for finding a hidden IP address in a malicious site using a domain name system (DNS) service according to an embodiment of the present disclosure. Hereinafter, for convenience of explanation, the apparatus 100 in which the method for finding a hidden IP address of a malicious site using the DNS service according to an embodiment of the present disclosure is performed will be briefly referred to as an apparatus 100.

Referring to FIG. 2, the apparatus 100 according to an embodiment of the present disclosure includes various devices capable of performing arithmetic processing to provide results to a user. For example, the apparatus 100 according to an embodiment of the present disclosure may include all of a computer, a server device, and a portable terminal, or may adopt any one thereamong.

Here, the computer may include, for example, a notebook computer equipped with a web browser, a desktop, a laptop, a tablet PC, a slate PC, and the like.

The server device is a server for processing information by performing communication with the external device, and includes an application server, a computing server, a database server, a file server, a game server, a mail server, a proxy server, a web server, and the like.

The portable terminal is a wireless communication device providing portability and mobility, and includes all kinds of handheld-based wireless communication devices, such as a personal communications system (PCS), a global system for mobile communications (GSM), a personal digital cellular (PDC), a personal handphone system (PHS), a personal digital assistant (PDA), an international mobile telecommunications (IMT)-2000, a code division multiple access (CDMA)-2000, a W-code division multiple access (W-CDMA), wireless broadband internet (WiBro) terminal, a smartphone, and the like, and a wearable device, such as a watch, a ring, a bracelet, an ankle bracelet, a necklace, glasses, contact lenses, or a head-mounted device (HMD).

In an embodiment, the apparatus 100 according to the present disclosure includes a collecting unit 110, a first filtering unit 120, a second filtering unit 130, a third filtering unit 140, and a determining unit 150. The components illustrated in FIG. 2 are not essential for implementing the apparatus 100 according to the present disclosure, so the apparatus 100 described herein may have more or fewer components than the components illustrated in FIG. 2.

For example, in a case in which a server operated for a malicious or illegal purpose such as hacking uses the DNS service to provide a malicious site while hiding a real IP address, in order to detect the hidden real IP address of the malicious site, the apparatus 100 according to the present disclosure collects IP addresses of the servers actually in operation all over the world connected through the network, and detects the real IP address of the server operating the malicious site based on the collected IP addresses of the real servers. Hereinafter, the present disclosure will be described in more detail.

The collecting unit 110 may collect real IP addresses for servers connected to all over the world through a network based on a predefined service port. For example, the collecting unit 110 may collect IP addresses for servers actually in operation by performing port scanning based on the predefined service port including an HTTP 80 port or HTTPS 443 port.

Here, the servers may be devices such as web servers for providing various services to clients (e.g., user terminals such as computers, laptops, and smartphones) connected through a network, and may provide websites to the clients. In addition, the servers may use the DNS service provided by the DNS server, and in this instance, the DNS service allows the clients to access the corresponding website using a server domain name Furthermore, the collecting unit 110 may acquire HTTP or HTTPS response information in response to an HTTP or HTTPS request based on the collected real IP addresses of the servers. Alternatively, the collecting unit 110 may acquire a banner message (i.e., banner information) by performing banner grabbing based on the collected real IP addresses of the servers.

Additionally, the collecting unit 110 may transmit an HTTP or HTTPS request to the malicious site using the DNS service, and receive response information from the malicious site in response thereto.

The first filtering unit 120 retrieves the response information of the servers obtained from the collecting unit 110, extracts the real IPs of the servers including contents similar to the response information of the malicious site, and derives the real IPs of the extracted servers as a first IP address candidate group.

In an embodiment, the first filtering unit 120 may perform banner filtering from the real IP addresses of the servers based on response information of the malicious site using the DNS service in order to extract the first IP address candidate group.

Here, the banner filtering may verify whether the banner information obtained by performing banner grabbing with respect to the real IP addresses of the servers is similar to a malicious site, and obtain the IP address of the filtered server based on the verification result. have. A more specific process will be described later.

The second filtering unit 130 may extract a second IP address candidate group by performing HTML filtering to verify whether the first IP address candidate group extracted from the first filtering unit 120 is similar to the HTML source of the malicious site.

Here, the HTML filtering is a method of filtering by verifying whether the HTML source obtained from the servers is similar to the HTML source of the malicious site, and can filter using a regular expression or using an HTML similarity comparison. A more specific process will be described later.

The third filtering unit 140 may extract the final IP address by performing image filtering for verifying whether the second IP address candidate group extracted from the second filtering unit 130 is similar to an image of the malicious site.

Here, image filtering is a method of filtering by verifying whether image information of the web site obtained from servers is similar to image information of the malicious site, and may use a structural similarity index measure (SSIM). A more specific process will be described later.

The determining unit 150 may determine whether the final IP address extracted from the third filtering unit 140 is the real IP address of the malicious site. For example, in a case in which the determining unit 150 determines that the final IP address is the real IP address of the malicious site, the determining unit 140 may block access to the final IP address. In addition, the determining unit 140 may provide information on the final IP address to an investigation agency, or provide a warning message or a warning screen to a client accessing the final IP address.

Moreover, according to an embodiment, although not illustrated in FIG. 2, the apparatus 100 according to the present disclosure may further include a memory unit, a control unit, and the like.

The memory unit may store data supporting various functions of the apparatus, and a program for operating the controller, may store input/output data (e.g., music files, still images, moving images, etc.), and may store a plurality of application programs (application programs or applications) running on the apparatus of the present disclosure, and data and instructions for operating the apparatus. At least a portion of these applications may be downloaded from an external server via wireless communication.

The memory may include a storage medium having at least one among a flash memory type memory, a hard disk type memory, a multimedia card micro type memory, a card type memory (e.g., an SD memory or an XD memory), a random access memory (RAM), static random access memory (SRAM), read-only memory (ROM), an electrically erasable programmable read-only memory (EEPROM), a programmable read-only memory (PROM), a magnetic memory, a magnetic disk, and an optical disk. Furthermore, although the memory unit is separated from the apparatus, it may be a database connected by wire or wirelessly.

The control unit may be embodied in a memory for storing data for algorithm for controlling operations of the components of the apparatus or for programs reproducing the algorithms, and at least one processor (not illustrated) performing the above-mentioned operation using the data stored in the memory. In this instance, the memory and the processor may be implemented as separate chips. Alternatively, the memory and the processor may be implemented as a single chip.

In addition, in order to implement various embodiments according to the present disclosure described with reference to FIGS. 3 to 8, the control unit may control the above-mentioned components by combining one or more of the components.

At least one component may be added or deleted in response to the performances of the components illustrated in FIG. 2. Additionally, it will be readily understood by those of ordinary skill in the art that the mutual positions of the components may be changed corresponding to the performance or structure of the system.

Meanwhile, the components illustrated in FIG. 2 refers to hardware components such as software and/or a field programmable gate array (FPGA), and an application specific integrated circuit (ASIC).

Hereinafter, a method for finding a hidden IP address of a malicious site using a DNS service performed by the apparatus 100 according to an embodiment of the present disclosure will be described in detail.

Figure 3:
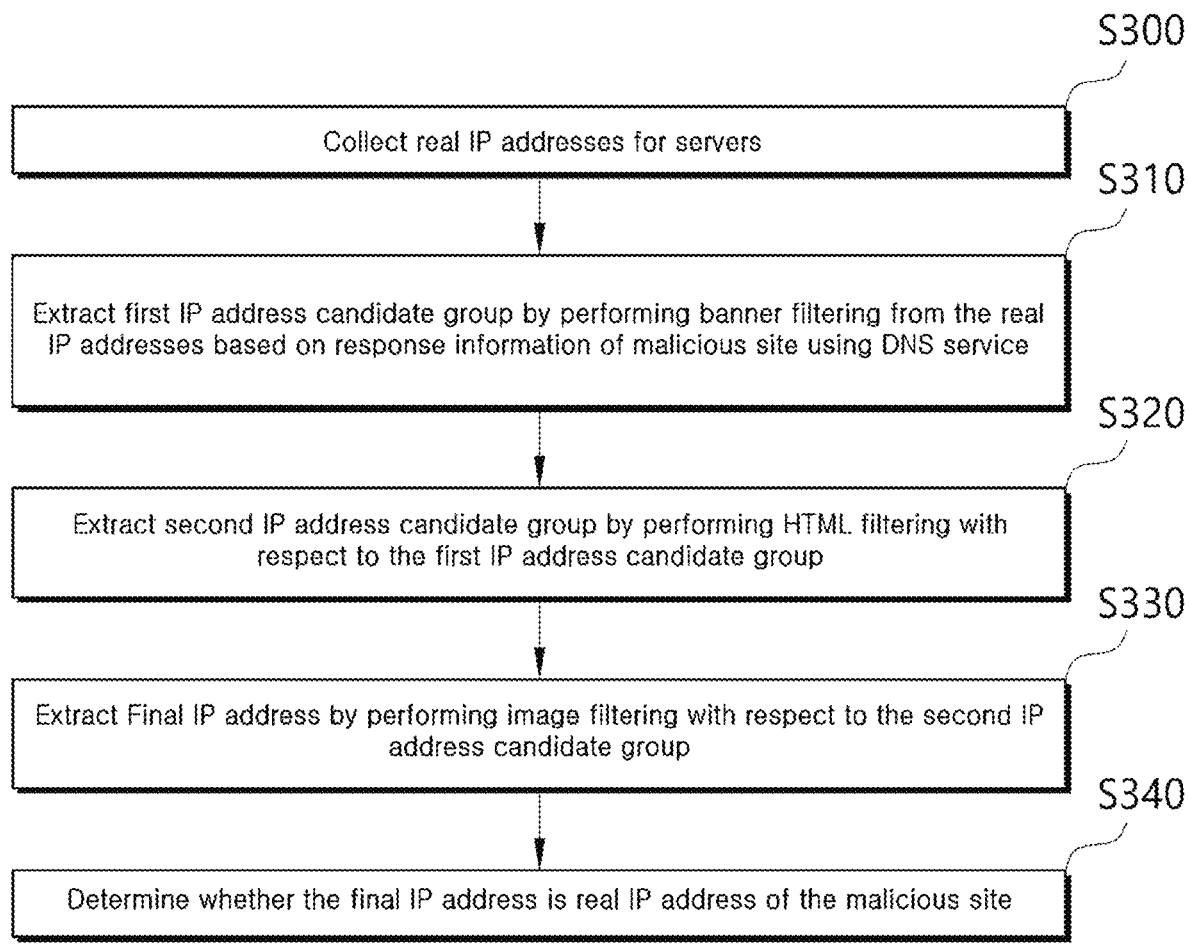
FIG. 3 is a flow chart schematically illustrating a method for finding a hidden IP address in a malicious site using a domain name system (DNS) service according to an embodiment of the present disclosure.

FIG. 3 is a flow chart schematically illustrating a method for finding a hidden IP address in a malicious site using a domain name system (DNS) service according to an embodiment of the present disclosure.

Figure 4:
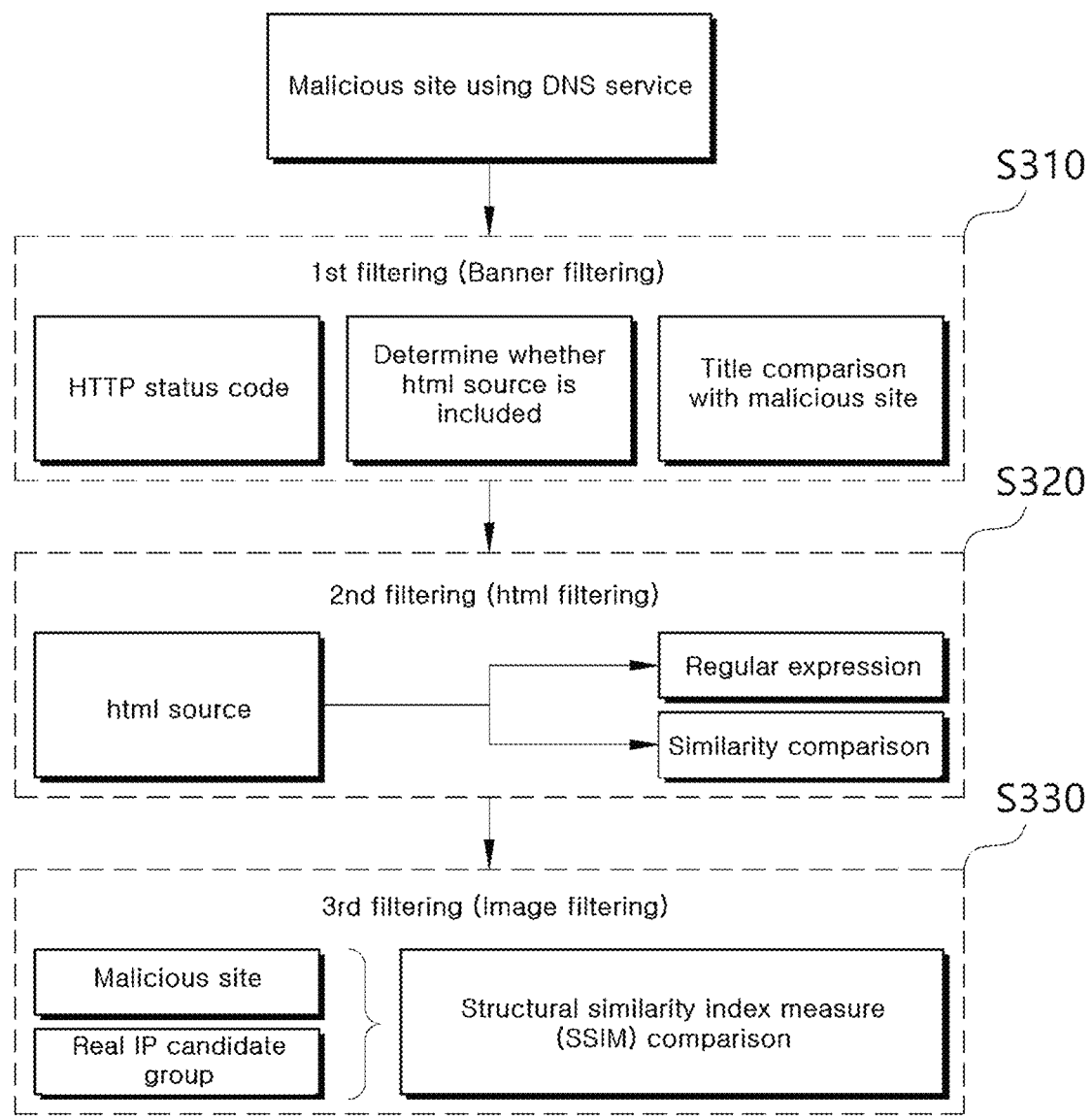
FIG. 4 is a flow chart illustrating an example of a method for finding a hidden IP address in a malicious site using a domain name system (DNS) service according to an embodiment of the present disclosure.

FIG. 4 is a flow chart illustrating an example of a method for finding a hidden IP address in a malicious site using a domain name system (DNS) service according to an embodiment of the present disclosure.

FIGS. 5 to 6B are diagrams for explaining banner filtering according to an embodiment of the present disclosure.

Figure 7:
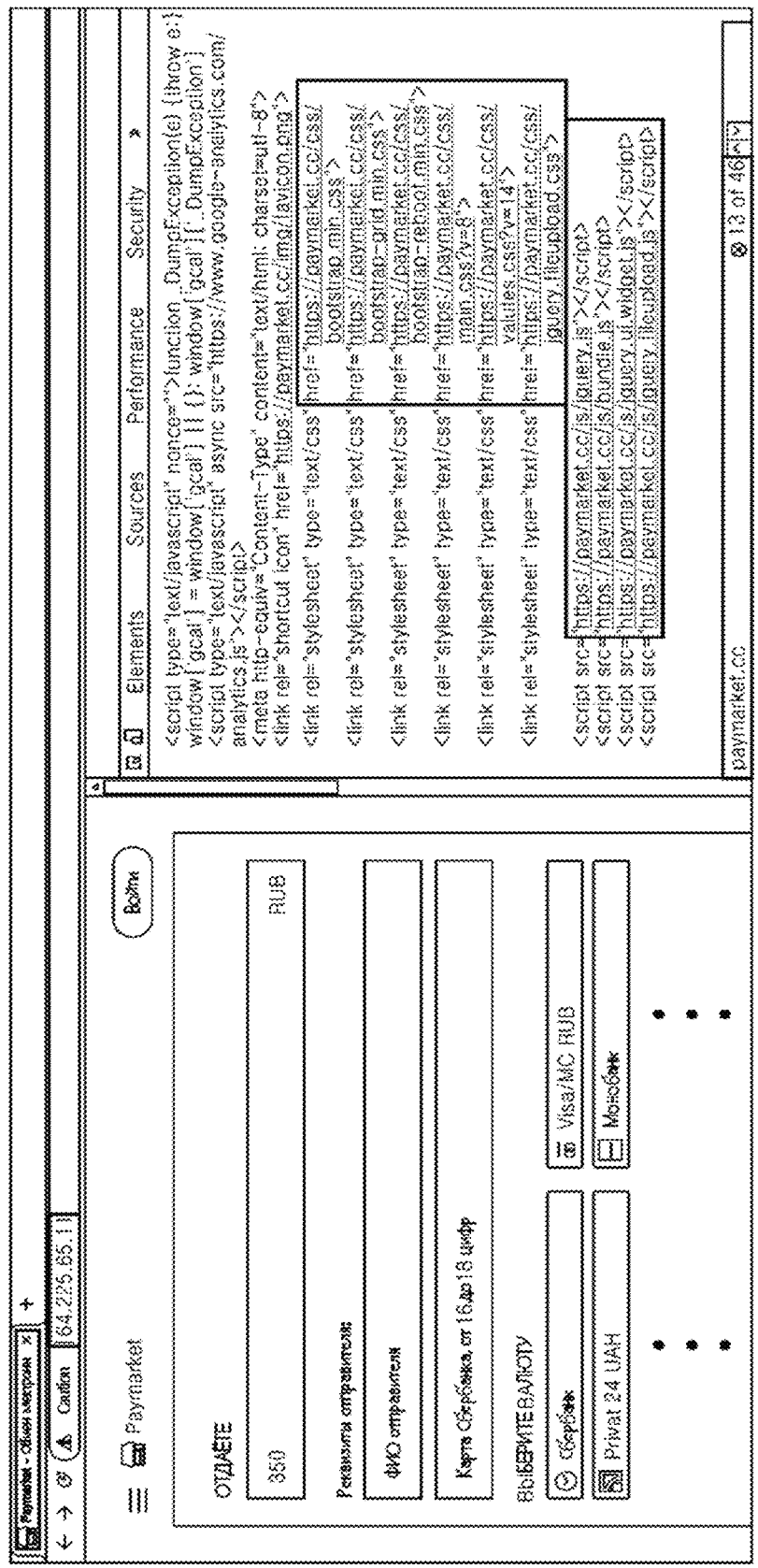
FIG. 7 is a diagram for explaining HTML filtering according to an embodiment of the present disclosure.

FIG. 7 is a diagram for explaining HTML filtering according to an embodiment of the present disclosure.

FIG. 8 is a diagram for explaining image filtering according to an embodiment of the present disclosure.

The operations of FIGS. 3 to 8 may be performed by the apparatus 100 disclosed in FIG. 2. Here, the apparatus 100 illustrated in FIG. 2 may be a computer apparatus, and in this instance, the operations of FIGS. 3 to 8 may be performed by a computer.

Referring to FIG. 3, the collecting unit 110 may collect real IP addresses for servers connected around the world through a network based on a predefined service port (S300).

In an embodiment, the collecting unit 110 may collect IP addresses for servers actually in operation by performing port scanning based on the predefined service port including an HTTP 80 port or an HTTPS 443 port.

Here, the servers may be devices such as web servers for providing various services to clients (e.g., user terminals such as computers, laptops, and smartphones) connected through a network, and may provide websites to the clients. In addition, the servers may use the DNS service provided by the DNS server, and in this instance, the DNS service allows the clients to access the corresponding website using a server domain name In this instance, in the case of a server operating a malicious site, it may be operated by hiding its real IP address using the DNS service and exposing only the IP address of the DNS server instead of the real IP address. Accordingly, the present disclosure provides a method for finding a hidden IP address of a malicious site as described later.

The first filtering unit 120 may perform banner filtering from the real IP addresses of the servers based on response information of the malicious site using the DNS service in order to extract the first IP address candidate group (S310).

That is, the first filtering unit 120 receives response information in response to the HTTP or HTTPS request from the servers collected through the network, and retrieves the response information of the servers, filters the IPs of the servers including contents similar to the response information of the malicious site, and derives the IPs of the filtered servers as a first IP address candidate group.

In an embodiment, the first filtering unit 120 may receive response information from the malicious site in response to the HTTP or HTTPS request. Furthermore, the first filtering unit 120 may obtain banner information by performing banner grabbing on the real IP addresses of the servers. Next, the first filtering unit 120 may perform banner filtering on the banner information obtained from the real IP addresses of the servers based on the response information of the malicious site, and extract a first IP address candidate group from the real IP addresses of the servers based on the banner filtering.

Here, the banner filtering may verify whether the obtained banner information is similar to the malicious site based on the real IP addresses of the servers, and obtain the IP address of the filtered server based on the verification result.

More specifically, referring to FIG. 4, the first filtering unit 120 may verify whether a specific HTTP status code is included in response information (i.e., banner information) obtained from the servers. In this instance, the specific HTTP status code may be information related to whether the request is successful. For instance, as illustrated in the response information illustrated in FIG. 5, it may be verified whether the HTTP status code is recorded as 200 (e.g., HTTP/1.1 200 OK, Status: 200 OK, and the like). In a case in which the HTTP status code is 200, it may mean that the server processed the request properly (i.e., the request was successful).

Furthermore, the first filtering unit 120 may verify whether the HTML source is included with respect to the response information (i.e., banner information) obtained from the servers. For example, as illustrated in FIG. 6A, only certificate information may exist in the response information without an HTML source, and as illustrated in FIG. 6B, the HTML source may be included in the response information.

In addition, the first filtering unit 120 may verify whether title information of the malicious site is included in the response information (i.e., banner information) obtained from the servers. For example, the first filtering unit 120 may transmit a request to the malicious site to obtain title information of the malicious site, and verify whether the title of the malicious site is included in response information (i.e., banner information) of the servers.

Moreover, the first filtering unit 120 may obtain IP addresses (i.e., first IP address candidate group) of the filtered servers based on the verification result.

The second filtering unit 130 may extract a second IP address candidate group by performing HTML filtering for verifying whether the first IP address candidate group is similar to the HTML source of the malicious site (S320).

In an embodiment, the second filtering unit 130 may obtain the HTML source for the first IP address candidate group extracted based on the banner filtering, and perform HTML filtering based on the HTML source for the first IP address candidate group. In addition, the second filtering unit 130 may extract a second IP address candidate group from the first IP address candidate group based on the HTML filtering.

Here, the HTML filtering is a method of filtering by verifying whether the HTML source obtained from the servers is similar to the HTML source of the malicious site, and can filter by using a regular expression or using a HTML similarity comparison.

More specifically, referring to FIG. 4, the second filtering unit 130 may perform HTML filtering by using a regular expression in the HTML source for the first IP address candidate group. That is, as illustrated in FIG. 7, in the case of the HTML source (right image in FIG. 7) obtained from the real IP server (left image in FIG. 7) of the malicious site, the domain address of the malicious site (e.g., https://paymarket.cc) may be included in the HTML source. Therefore, the second filtering unit 130 may extract the domain address of the malicious site included in each HTML source obtained from the first IP address candidate group as a regular expression, and verify whether the domain address of the malicious site is similar to the HTML source of the malicious site based on the extracted result. That is, filtering using the regular expression may be performed with respect to each HTML source obtained from each server IP address included in the first IP address candidate group.

In an embodiment, the second filtering unit 130 may extract a character string expressed in a URL from an HTML source obtained from a server IP address included in the first IP address candidate group by using the regular expression. In this instance, the number A of all URLs extracted from the HTML source may be counted. Additionally, the second filtering unit 130 may count the number B of URLs including the domain address of the malicious site among all the extracted URLs. The second filtering unit 130 may derive a similarity value based on the number A of all URLs and the number B of URLs corresponding to the counted domain addresses of malicious sites, and verify whether the derived similarity value is greater than a predetermined threshold. For example, the similarity value may be a value calculated by the number B of URLs corresponding to the counted domain addresses of the malicious sites/the number A of all URLs. In this instance, in a case in which the similarity value is greater than the preset threshold, it may be determined that the HTML source of the corresponding server has a high probability of being similar to the HTML source of the malicious site. Additionally, in this case, it is possible to filter the server IP address having high similarity as the real IP address candidate group of the malicious site.

In addition, referring to FIG. 4, the second filtering unit 130 may perform HTML filtering by using a similarity comparison between the HTML source for the first IP address candidate group and the HTML source of the malicious site. In this instance, with respect to each HTML source obtained from each server IP address included in the first IP address candidate group, a similarity comparison with the HTML source of the malicious site may be performed.

In an embodiment, the second filtering unit 130 may calculate the HTML similarity based on style similarity and structural similarity between the HTML source obtained from the server IP address included in the first IP address candidate group and the HTML source of the malicious site. Here, the style similarity with respect to the HTML source may be calculated based on Jaccard similarity between sets of CSS classes. The structural similarity with respect to the HTML source may be calculated based on sequence similarity between HTML tags. That is, the second filtering unit 130 may calculate the HTML similarity by combining the style similarity and the structural similarity between the HTML sources, and verify whether the HTML similarity is greater than a predetermined threshold. In a case in which the HTML similarity is greater than the predetermined threshold, it may be determined that the HTML source of the corresponding server has a high probability of being similar to the HTML source of the malicious site. Furthermore, in this case, it is possible to filter the server IP address having high similarity as the real IP address candidate group of the malicious site.

The third filtering unit 140 may extract the final IP address by performing image filtering to verify whether the second IP address candidate group is similar to an image of the malicious site (S330).

In an embodiment, the third filtering unit 140 may obtain image information on the second IP address candidate group extracted based on the HTML filtering, and perform image filtering based on the image information on the second IP address candidate group. In addition, the third filtering unit 140 may extract a final IP address from the second IP address candidate group based on the image filtering.

Here, the image filtering is a method of filtering by verifying whether image information of the web site obtained from servers is similar to image information of the malicious site, and may use a structural similarity index measure (SSIM).

More specifically, referring to FIG. 4, the third filtering unit 140 may perform image filtering by using the image structural similarity between the second IP address candidate group and the malicious site. In this instance, an image structural similarity comparison with image information of malicious sites may be performed for each image information obtained from each server IP address included in the second IP address candidate group.

In an embodiment, the third filtering unit 140 may calculate the image structural similarity between the image information of the web site and the image information of the malicious site obtained from the server IP address included in the second IP address candidate group, and verify whether the image structural similarity is greater than a predetermined threshold.

Here, the image structural similarity is an algorithm that calculates how similar two images are and which parts are different using open source computer vision (OpenCV) and a scikit image. For instance, as illustrated in FIG. 8, the image structural similarity can be measured by using the OpenCV and the scikit image with respect to two different images. As the two images are similar, an image structural similarity value can be derived to be high. As illustrated in FIG. 8, it can be seen that the image structural similarity (SSIM) value for the two dog images shown at the bottom of FIG. 8 was calculated to be the highest as 0.82. Accordingly, it may be determined that the two dog images shown at the bottom has a high probability of having similarity.

For example, the third filtering unit 140 may access the web site obtained from the server IP address included in the second IP address candidate group and the malicious site as selenium to take a screenshot. In this instance, for more accurate measurement, image information may be collected through screenshots for the uppermost and lowermost two regions of the web site (i.e., webpage). Additionally, the third filtering unit 140 may convert the screenshot into grayscale. In this instance, the third filtering unit 140 can remove noise, improve the operation processing speed, and increase accuracy by converting the screenshot of the web site of the server and the screenshot of the malicious site into grayscale. The third filtering unit 140 may measure the image structural similarity of each screenshot (converted into grayscale) and verify whether the measured image structural similarity value is greater than a predetermined threshold value. In a case in which the image structural similarity is greater than the predetermined threshold, it may be determined that the website of the corresponding server has a high probability of being similar to the malicious site. In addition, in this case, it is possible to filter the server IP address having high image structural similarity as the real IP address candidate group of the malicious site (i.e., final IP address candidate).

The determining unit 150 may determine whether the final IP address is the real IP address of the malicious site (S340).

In an embodiment, the determining unit 150 may detect a server IP address having the highest image structural similarity among the second IP address candidate group, and determine the detected server IP address as the final IP address. That is, the determining unit 150 may determine that the final IP address is the real IP address of the malicious site and block access to the final IP address. In addition, the determining unit 150 may provide information on the final IP address to an investigation agency, or provide a warning message or a warning screen to a client accessing the final IP address.

Although FIGS. 3 and 4 illustrate operations S300 to S340 being sequentially executed, it is only to exemplify the technical idea of this embodiment. Accordingly, it will be understood by the skilled persons in the art that the sequence of operations illustrated in FIGS. 3 and 4 may be changed, or one or more operations selected from S300 to S340 may be executed in parallel without deviating from the essential characteristics of the present embodiment. That is, since various modifications and variations may be applied to this embodiment, FIGS. 3 and 4 are not limited to the time sequential order.

According to the present disclosure described above, even if a server operated for a malicious or illegal purpose such as hacking provides a malicious site while hiding a real IP address using the DNS service, the present disclosure can detect the IP address of the real server of the malicious site, thereby effectively blocking access to malicious site. Furthermore, the present disclosure can prevent damages caused by the malicious site since finding the real server operating the malicious site.

The method according to an embodiment of the present disclosure can be implemented as a program (or application) to be executed by being combined with a computer which is hardware, and can be stored in a medium.

On the other hand, the disclosed embodiments may be implemented in the form of a recording medium storing instructions executable by a computer. Instructions may be stored in the form of program code and, when executed by a processor, may generate a program module to perform the operation of the disclosed embodiments. The recording medium may be embodied as a computer-readable recording medium.

The computer readable recording medium includes all kinds of recording media in which instructions that can be decrypted by a computer are stored. For example, there may be a read-only memory (ROM), a random-access memory (RAM), a magnetic tape, a magnetic disk, a flash memory, an optical data storage device, and the like.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

The invention claimed is:

1. A method for finding a hidden Internet Protocol (IP) address in a malicious site using a domain name system (DNS) service, executed by a computer, the method comprising:
   collecting real IP addresses for servers based on a predefined service port;
   extracting a first IP address candidate group by performing banner filtering from the real IP addresses based on response information of a malicious site using a DNS service;
   extracting a second IP address candidate group by performing Hypertext Markup Language (HTML) filtering to verify whether the first IP address candidate group is similar to a HTML source of the malicious site;
   extracting a final IP address by performing image filtering to verify whether the second IP address candidate group is similar to an image of the malicious site; and
   determining whether the final IP address is a real IP address of the malicious site,
   wherein the extracting the second IP address candidate group comprises:
      calculating HTML similarity based on style similarity and structural similarity between a HTML source for the first IP address candidate group and the HTML source of the malicious site; and
      generating the second IP address candidate group including IP addresses having the HTML similarity that is greater than a predetermined threshold,
   wherein the style similarity is calculated based on Jaccard similarity between sets of Cascading Style Sheets (CSS) classes of the HTML source for the first IP address candidate group and the HTML source of the malicious site, and the structural similarity is calculated based on sequence similarity between HTML tags of the HTML source for the first IP address candidate group and the HTML source of the malicious site, and
   wherein the image filtering is performed by calculating a structural similarity index measure (SSIM) of each of image information of a web site corresponding to the second IP address candidate group and image information of the malicious site.

2. The method according to claim 1, wherein the collecting the real IP addresses comprises collecting the real IP addresses for the servers by performing port scanning based on the predefined service port, and
   wherein the predefined service port includes a Hypertext Transfer Protocol (HTTP) 80 port or a Hypertext Transfer Protocol Secure (HTTPS) 443 port.

3. The method according to claim 1, wherein the extracting the first IP address candidate group comprises:
   receiving the response information in response to a Hypertext Transfer Protocol (HTTP) or Hypertext Transfer Protocol Secure (HTTPS) request from the malicious site;
   obtaining banner information by performing banner grabbing with respect to the real IP addresses;
   performing the banner filtering with respect to the banner information obtained from the real IP addresses based on the response information of the malicious site; and
   extracting the first IP address candidate group from the real IP addresses based on the banner filtering.

4. The method according to claim 3, wherein the performing the banner filtering comprises:
   verifying whether a specific HTTP status code is included in the banner information;
   verifying whether an HTML source is included in the banner information; and
   verifying whether title information of the malicious site is included in the banner information.

5. The method according to claim 1, wherein the extracting the second IP address candidate group comprises:
   obtaining an HTML source for the first IP address candidate group extracted based on the banner filtering;
   performing the HTML filtering based on the HTML source for the first IP address candidate group; and
   extracting the second IP address candidate group from the first IP address candidate group based on the HTML filtering.

6. The method according to claim 5, wherein the performing the HTML filtering comprises:
   extracting all Uniform Resource Locators (URLs) included in the HTML source for the first IP address candidate group;
   counting a number of URLs including the domain address of the malicious site among all the URLs; and
   verifying whether a similarity value derived based on the number of all URLs and the counted number is greater than a predetermined threshold value.

7. A non-transitory computer-readable recording medium storing program for implementing the method for finding a hidden IP address of a malicious site using the domain name system (DNS) service of claim 1.

8. An apparatus executing a method for finding a hidden Internet Protocol (IP) address in a malicious site using a domain name system (DNS) service, the apparatus comprising:

a collecting unit collecting real IP addresses for servers based on a predefined service port;

a first filtering unit extracting a first IP address candidate group by performing banner filtering from the real IP addresses based on response information of a malicious site using a DNS service;

a second filtering unit extracting a second IP address candidate group by performing Hypertext Markup Language (HTML) filtering to verify whether the first IP address candidate group is similar to a HTML source of the malicious site;

a third filtering unit extracting a final IP address by performing image filtering to verify whether the second IP address candidate group is similar to an image of the malicious site; and a determining unit determining whether the final IP address is a real IP address of the malicious site, wherein the second filtering unit, in extracting the second IP address candidate group: calculates HTML similarity based on style similarity and structural similarity between a HTML source for the first IP address candidate group and the HTML source of the malicious site; and generates the second IP address candidate group including IP addresses having the HTML similarity that is greater than a predetermined threshold, wherein the style similarity is calculated based on Jaccard similarity between sets of Cascading Style Sheets (CSS) classes of the HTML source for the first IP address candidate group and the HTML source of the malicious site, and the structural similarity is calculated based on sequence similarity between HTML tags of the HTML source for the first IP address candidate group and the HTML source of the malicious site, and wherein the third filtering unit, in the image filtering, calculates a structural similarity index measure (SSIM) of each of image information of a web site corresponding to the second IP address candidate group and image information of the malicious site.

9. The apparatus according to claim 8, wherein the collecting unit collects the real IP addresses for the servers by performing port scanning based on the predefined service port, and wherein the predefined service port includes a Hypertext Transfer Protocol (HTTP) 80 port or a Hypertext Transfer Protocol Secure (HTTPS) 443 port.

10. The apparatus according to claim 8, wherein the first filtering unit, in extracting the first IP address candidate group, receives the response information in response to a Hypertext Transfer Protocol (HTTP) or Hypertext Transfer Protocol Secure (HTTPS) request from the malicious site, obtains banner information by performing banner grabbing with respect to the real IP addresses, performs the banner filtering with respect to the banner information obtained from the real IP addresses based on the response information of the malicious site, and extracts the first IP address candidate group from the real IP addresses based on the banner filtering.

11. The apparatus according to claim 10, wherein the first filtering unit, in performing the banner filtering, verifies whether a specific HTTP status code is included in the banner information, verifies whether an HTML source is included in the banner information, and verifies whether title information of the malicious site is included in the banner information.

12. The apparatus according to claim 8, wherein the second filtering unit, in extracting the second IP address candidate group, obtains an HTML source for the first IP address candidate group extracted based on the banner filtering, performs the HTML filtering based on the HTML source for the first IP address candidate group, and extracts the second IP address candidate group from the first IP address candidate group based on the HTML filtering.

13. The apparatus according to claim 12, wherein the second filtering unit, in performing the HTML filtering, extracts all Uniform Resource Locators (URLs) included in the HTML source for the first IP address candidate group, counts a number of URLs including the domain address of the malicious site among all the URLs, and verifies whether a similarity value derived based on the number of all URLs and the counted number is greater than a predetermined threshold value.

* * * * *